(12) United States Patent
Lovatt

(10) Patent No.: US 6,929,673 B1
(45) Date of Patent: Aug. 16, 2005

(54) FORMULATION OF PHOSPHORUS FERTILIZER FOR PLANTS

(75) Inventor: Carol J. Lovatt, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 61 days.

(21) Appl. No.: 09/637,621

(22) Filed: Aug. 11, 2000

Related U.S. Application Data

(63) Continuation of application No. 09/126,233, filed on Jul. 30, 1998, now Pat. No. 6,113,665, which is a continuation of application No. 08/642,574, filed on May 3, 1996, now Pat. No. 5,830,255, which is a continuation of application No. 08/192,508, filed on Feb. 7, 1994, now Pat. No. 5,514,200.

(51) Int. Cl.$^7$ .............................................. C05B 15/00
(52) U.S. Cl. ........................ 71/11; 71/27; 71/32; 71/41; 71/64.1
(58) Field of Search ................................. 71/11, 27, 32, 71/41, 64.1

(56) References Cited

U.S. PATENT DOCUMENTS

| | | | |
|---|---|---|---|
| 1,976,905 A | 10/1934 | Thordarson | |
| 2,663,628 A | 12/1953 | Thomsen | |
| 3,342,598 A | 9/1967 | Bard | |
| 3,798,020 A | 3/1974 | Parham et al. | |
| 3,941,896 A | 3/1976 | Smith et al. | |
| 3,969,293 A | 7/1976 | White et al. | |
| 4,066,390 A | 1/1978 | Christie et al. | |
| 4,075,324 A | 2/1978 | Thizy et al. | |
| 4,119,724 A | 10/1978 | Thizy et al. | |
| 4,139,616 A | 2/1979 | Ducret et al. | |
| 4,334,905 A | 6/1982 | Wagner et al. | |
| 4,542,023 A | 9/1985 | Lacroix et al. | |
| 4,698,334 A | 10/1987 | Horriere et al. | |
| 4,755,614 A | 7/1988 | Corbet | |
| 4,780,458 A | 10/1988 | Hodakowski et al. | |
| 4,806,445 A | 2/1989 | Horriere et al. | |
| 4,849,219 A | 7/1989 | Staub et al. | |
| 4,935,410 A | 6/1990 | Barlet | |
| 5,070,083 A | 12/1991 | Barlet | |
| 5,099,049 A | 3/1992 | Chamberlain | |
| 5,124,344 A | 6/1992 | Greiner et al. | |
| 5,133,891 A | 7/1992 | Barr et al. | |
| 5,169,646 A | 12/1992 | Horriere et al. | |
| 5,206,228 A | 4/1993 | Collins | |
| 5,246,953 A | 9/1993 | Greiner et al. | |
| 5,395,418 A | 3/1995 | Vetanovetz et al. | |
| 5,514,200 A | * 5/1996 | Lovatt | ............................ 71/11 |
| 5,616,532 A | 4/1997 | Heller et al. | |
| 5,707,418 A | 1/1998 | Hsu | |
| 5,736,164 A | 4/1998 | Taylor | |
| 5,736,313 A | 4/1998 | Spargo et al. | |
| 5,800,837 A | 9/1998 | Taylor | |
| 5,830,255 A | * 11/1998 | Lovatt | ............................ 71/11 |
| 6,113,665 A | 9/2000 | Lovatt | |
| 6,169,057 B1 | 1/2001 | Lovatt | |

FOREIGN PATENT DOCUMENTS

| | | |
|---|---|---|
| FR | 2359077 | 7/1976 |
| FR | 2389587 | 1/1979 |
| GE | 3417133 | 7/1985 |
| JP | 61-291482 | 12/1986 |
| JP | 4-74784 | 3/1992 |
| RU | 655373 | 4/1979 |
| WO | WO86/00613 | 1/1986 |

OTHER PUBLICATIONS

Robertson and Boyer, "Orthophosphite as a Buffer for Biological Studies," *Archives of Biochemistry and Biophysics*, 62, pp. 396–401 (1956).*

Acadian Seaplants Ltd. (publisher) Product and Technical Information Sheet for *Ascophyllum nodosum* Seaweed Meal and Flour–Products, 2 pages. (No Date).

Adams, et al. "Transition of Phosphite to Phosphate in Soils" *Soil Science* (1953) vol. 75, pp. 361–371, no month.

Agrichem Product Sheet for Supa K30, published by Agrichem Manufacturing Ind.: Australia, 3 pages (No Date).

Agrichem Product Sheet for Supa Link, by Agrichem Manufacturing Ind.: Australia, 2 pages (No Date).

Agrichem Product Sheet for Supa Stand Phos, published by Agrichem Manufacturing Ind.; Australia, 4 pages (No Date).

Agrichem Product Information Brochure for "Supa Stand Phos: Supa Crop," subtitled "For the Cotton and Corn Farmer," published by Agrichem Manufacturing Ind.: Australia, 1 page (Oct. 1990).

Agrichem Product Sheet for Supa Crop, published by Agrichem Manufacturing Ind.: Australia, 1 page (No Date).

Agrichem, Correspondence between Agrichem and Dept. of Primary Industries, Queensland Government, 24 pages (No Date).

Agrichem Product Information Brochure for "Supa Stand Phos: Supa Protective Pop–Up Starter," published by Agrichem Manufacturing Ind.: Australia, 2 pages (Aug. 1990).

Agrichem Product Information Brochure for "Kelpak: Liquid Seaweed Concentrate 'Ecklonia maxima'," published by Agrichem Manufacturing Ind.: Australia, 1 page (No Date).

Agrichem Information Brochure for "Organic Extract: Typical Analysis," published by Agrichem Manufacturing Ind.: Australia, 1 page (No Date).

(Continued)

*Primary Examiner*—Wayne A Langel
(74) *Attorney, Agent, or Firm*—Morgan, Lewis & Bockius, LLP

(57) ABSTRACT

Concentrated phosphorus fertilizers are disclosed that comprise a buffered composition of an organic acid and salts thereof and a phosphorous-containing acid and salts thereof. The concentrated phosphorus fertilizers can be diluted with water of pH ranging from about 6.5 to about 8.5 at ratios of concentrate to water at about 1:40 to about 1:600 to result in a fertilizer having a pH in the range acceptable for foliar uptake of phosphorus.

6 Claims, No Drawings

OTHER PUBLICATIONS

Agrichem Manufacturing Ind., "Water Injection and Foliar Trials 1990/1991: Cotton & Maize" published by Agrichem Manufacturing Ind.: Australia (1990–1991), 3 pages, no month.

Agrichem Product Sheet for Supa Link, published by Agrichem Manufacturing Ind.: Australia, 2 pages (No Month), no date.

Alexander, Martin "Introduction to Soil Microbiology" *Published by John Wiley & Sons, Inc.* (No Date) pp. 352–369.

Aly, et al. "Effect of Meteorological Factors and Fertilization on Barley Powdery Mildew Infection" *Agricultural Research Review* (1987) vol. 65(2), pp. 233–242, no month.

Bedi, et al. "Influence of Nitrogen, Phosphorus and Potassium on the Development of Early Blight of Tomato" *Indian Phytopathology* (1983) vol. 36(3), pp. 546–548, no month.

Biagro Western Sales, S.A. "SPAN, P, P–K, P–K+ Copper, P–Zn+Mn, P–Ca" product data sheet; Visalia, CA. (No Date).

Biagro, S.A. "Metalosate F, Cobre, and S" product data sheet; Valencia, Spain (No Date).

Product catalog of Biagro (Bioestimulantes Agricolas, S.A.), a Spanish company, undated but believed to be before Feb. 7, 1993, (with one English translation of all of the fifth page (the page containing Metalosate–F product) and another English translation of only the three Metalosate product on the fifth page).

Bompeix et al., "Modalités de l'obtention des nécroses bloquantes sur feuilles détachées de Tomate par l'action du tris–O–éthyl phosphonate d'aluminum (phoséthyl d'aluminium), hypothéses sur son mode d'action in vivo," Ann. Phytophathol., 12:4, pp. 337–351, 1980 (French with English translation) (No Month).

Bompeix et al., "Mode d'action du phoseéthyl al," Phytiatrie–Phytopharmacie, 30, pp. 257–272, 1981 (French with English translation) (No Month).

Brennan, et al. "Effect of Superphosphate and Superphosphate Plus Flutriafol on Yield and Take–all of Wheat" *Australian Journal of Experimental Agriculture* (1989) vol. 29(2), pp. 247–252, no month.

Letter from the California Department of Food and Agriculture, dated Nov. 17, 1993, to Biagro Western Sales, Inc., and attached labeling information.

California Fertilizer Association, "Western Fertilizer Handbook" *Soil Improvement Committee, California Fertilizer Association, Horticulture Ed. Interstate Publishers, Danville, Ill.* (1990), no month.

Clark, et al. "Fertilizer Trial Using Water Injection Technique with Supracrop Products" *Report by D.Q. Clark & Associates Pty Ltd.* (Jul. 1991), 8 pages.

Coffery, et al. "Phosphonates: Antifungal Compounds Against Oomycetes" *California Avocado Growers Yrbk Nitrogen, Phosphorus and Sulphur Utilization by Fungi Symposium of the British Mycological Society* (1988), pp. 106–129, no month.

Cook, A.A., "Genetics of Resistance in *Capsicum annuum* to Two Virus Diseases" *Phytopathology* (May 1960) Vol. 50, pp. 364–365.

Cress, Forrest "UCR Phosphite Fertilization Research Could Yield Double Benefit for Avocado Growers", a University of California Newsletter: Division of Agriculture and Natural Resources, 2 pages (No Date).

Dabash, et al. "Relation Between Fertilizers and White Rot Disease of Onion with Reference to the Rhizosphere" *Agriculture Research Review* (1985) vol. 63(2), pp. 99–110, no month.

Embleton, et al. "Leaf Analysis Standards" *The Citrus Industry: Proc. Int. Soc. Citriculture* (1978) pp. 184–186, no month.

Englehard, Arthur W. "Historical Highlights and Prospects for the Future" *Soilborne Plant Pathogens: Management of Diseases with Macro– and Microelements APS Press: The American Phytopathological Society, St. Paul, Minnesota* (1989) pp. 9–15, no month.

Engelhard, Arthur W. (editor) "Definition of Phosphorus and Potassium" *Soilborne Plant Pathogens: Management of Diseases with Macro– and Microelements: APS Press: The American Phytopathological Society, St. Paul, Minnesota ( )* pp. 55–56, no date.

Fahmy, et al. "Some Factors Affecting the Incidence of Potato Brown Rot" *Assiut Journal of Agricultural Sciences* (1990) vol. 21(5), pp. 221–230, no month.

Fenn, et al. "Studies on the In Vitro and In Vivo Antifungal Activity of Fosetyl–Al and Phosphorous Acid" *Phytopathology* (1983), vol. 74, pp. 606–611, no month.

Fenn, et al. "Quantification of Phosphonate and Ethyl Phosphonate in Tobacco and Tomato Tissues and Significance for the Mode of Action of Two Phosphonate Fungicides" *Phytopathology* (1989) vol. 79(1), pp. 76–82, no month.

First Choice Product Sheet for pHortess, published by Western Farm Service, Inc., Fresno, California, 1 page (No Date).

Fraizer, et al. "Crystallography and Equilibrium Solubility for Ammonium and Potassium Orthophosphites and Hypophosphites" *Fertilizer Research* (1992) vol. 32, pp. 161–168, no month.

Gottstein, et al. "Induction of Systemic Resistance to Anthracnose in Cucumber by Phosphates" *Phytopathology* (Aug. 1989) vol. 79, pp. 176–179.

Graham, et al. "Phytophthora Root Rot Development on Mycorrhizal and Phosphorus–fertilized Nonmycorrhizal Sweet Orange Seedlings" *Plant Disease* (1988) vol. 72(7), pp. 611–614, no month.

Granade, et al. "Increasing Yield and Reducing Disease on Wheat with P and K Fertilization" *Better Crops with Plant Food* vol. 74(2), pp. 26–27, 30, no date.

Product Data Sheet for "Corn Steep Liquor," published by Grain Processing Corporation, 1 page, no date.

Griffith, et al. "Crop Responses at High Soil Test Phosphorus Levels" *Better Crops with Plant Food Published by the Potash & Phosphate Institute (PPI) Norcross, Georgia* (Fall 1992), 2 pages, no month.

Gubler, et al. "California Plant Disease Handbook and Study Guide for Agricultural Pest Control Advisors: Glossary of Terms" *published by ANR Publications: University of California; Oakland, California*, pp. 153–155, no date.

Grossl, et al. "Precipitation of Dicalcium Phosphate Dihydrate in the Presence of Organic Acids" *Soil Science Society of America Jour.* (May–Jun. 1991) Col. 55(3), p. 670–675.

Guest and Grant, "The Complex Action of Phosphonates as Antifungal Agents," *Biological Review* (1991) vol. 66, pp. 159–187, no month.

Gupta, et al. "Effect of Fertilizer Application on Severity of Sooty Stripe of Sorghum (*Sorghum bicolor*) Caused by *Ramulispora sorghi*" *Indian Journal of Agricultural Sciences* (1990) vol. 60 (1), pp. 76–77, no month.

Hartley et al., part of "Experimental Methods for Studying Equilibria I," chapter 7 in Solution Equilibia, Ellis Norwood Limited, 1980, pp. 124–127 (No Month).

Huber, Dr. Don M., "Micronutrients and Plant Disease" *Crop Management, Ag Consultant* (Feb. 1994).

Huber, Dr. Don M., "Introduction for: Soilborne Plant Pathogens: Management of Diseases with Macro– and Microelements" Engelhard, Arthur. W. (editor): *APS Press: The American Phytopathological Society, St. Paul, Minnesota* (1989) pp. 1–8, no month.

Jaffe, B.A., "Influence of Root Biomass on Number of *Pratylenchus penetrans* Within Host Roots" *Phytopathology* (Jun. 1980) vol. 70, pp. 1214–1216.

Jayaraj, et al. "Effect of Potash Nutrition on the Stem Rot Incidence and Yields of Rice" *Journal of Potassium Research* (1991) vol. 7(1), pp. 62–66, no month.

Jeyraman, et al. "Role of Potassium Treatment on Yield and Incidence of Pests and Disease in Chilli" *Journal of Potassium Research* (1988) vol. 4(2), pp. 67–70, no month.

Karwasra, et al. "Host Nutrition in Relation to Soft Rot Incidence in Potato" *Plant Disease Research* (1990) vol. 5(2), pp. 170–174, no month.

Lawton, Kirk, "Phosphate Fertilizer in Irrigation Water" *Source Unknown* (No date) pp. 1532–1533.

Lovatt, Carol J., "A Definitive Test to Determine Whether Phosphite Fertilization Can Replace Phosphate Fertilization to Supply P in the Metabolism of 'Hass' on 'Duke 7.' A Preliminary Report," California Avocado Society 1990 Yearbook, 74, pp. 61–64 (1990), (No Month Available).

Lovatt, Carol J., "A Definitive Test to determine Whether Phosphite Fertilization Can Replace Phosphate Fertilization to Supply P in the Metabolism of 'Hass' on 'Duke 7.' A Preliminary Report," 4 pages (1992), (No Month Available).

Lovatt, "Avocado Research Project Plan and Grant Requirements," a grant proposal presented to the California Avocado Society for fiscal year 1990–1991(No Month).

Lovatt, Carol J. "A Definitive Test to Determine Whether Phosphite Fertilization can Replace Phosphate Fertilization to Supply P in the Metabolism of 'Hass' on Duke 7.—a Preliminary Report" *Proc. of Second World Avocado Congress (1992), Unknown Citograph* (1990) vol. 75(7), p. 161, no month.

Lovatt, Carol J., "Foliar Phosphorus Fertilization of Citrus by Foliar Application of Phosphite" *Summary of Citrus Research* (1990), pp. 25–26, no month.

Lucas et al., "Phosphite Injury to Corn," Agronomy Journal, 71, pp. 1063–1065, 1979 (No Month).

Mac Intire, et al. "Fertilizer Evaluation of Certain Phosphorus, and Phosphoric Materials by Means of Pot Cultures" *Agronomy Journal* (Nov. 1950), vol. 42(11), p. 543–549.

Mahadevamurthy, et al. "Effect of Fertilizer Amendment of Soil and Antagonist Treatment on Sclerotial Germination on *Claviceps fusiformis*" *Plant Disease Research* (1990) vol. 5(2), pp. 212–215, no month.

Malacinski and Konetzka, "Bacterial Oxidation of Orthophosite," Journal of Bacteriology, vol. 91, 578–582, (1996), no month.

Mattingly, et al. "Progress in the Chemistry of Fertilizer and Soil Phosphorus" *Topics in Phosphorus Chemistry* (1967) vol. 4, pp. 157–290, no month.

Maxicrop product sheet: Seaweed Products for Agriculture and Horticulture (5 pgs.) (No Date).

McLean, Ben, "The Effects of Nitrogen Phosphorous, and Potassium Fertilization on Citrus Fruit Quality" (Apr. 1991) found in *Reports for HOS 6412 Nutrition of Horticulture Crops Vegetable Crops Department of Institute of Food and Agricultural Sciences, University of Florida: Review Papers* (Spring 1991) by Locascio, Dr. S. J.

Miyake, et al. "Phosphate Response of Rice in Indonesian Paddy Fields" *Technical Bulletin of the Tropical Agriculture Research Center* (1984) No. 17, pp. 1–78, no month.

Mohit–Singh, et al. "Effect of Interaction of Nitrogen, Phosphorus and Potash on Alternaria Leaf Sport and Fruit Rot of Brinjal" *Farm Science Journal* (1988) vol. 3(1), pp. 21–23. CAB Abstract, no month.

Mucharromah, et al. "Oxalate and Phosphates Induce Systemic Resistance Against Diseases Caused by Fungi, Bacteria and Viruses in Cucumber" *Kentucky Agricultural Experiment Station journal paper* (Jul. 1990), 6 pages.

Muchovej et al., "Effect of Exchangeable Soil Aluminum and Alkaline Calcium Salts on the Pathogenicity and Growth of *Phytophthora capsici* from Green Pepper," Phytopathology, 70, pp. 1212–1214, 1980. (No month).

Mustika, et al. "Control of Pepper Yellow Disease with Fertilizer and Pesticides" *Pemberitaan, Penelitian Tanaman Industri Indonesia* (1984) vol. 9(50), pp. 37–43, no month.

Nayudu, et al. "Bacterial Spot of Tomato as Influenced by Temperature and by Age and Nutrition of the Host" *Phytopathology* (May 1960) vol. 50, pp. 360–363.

Nielsen, et al. "Response of Fruit Trees to Phosphorus Fertilization" *Acta Horticulturae* (1990) No. 274, pp. 347–359, no month.

Obreza, et al. "Citrus Fertilizer Management on Calcareous Soils" *Circular 1127, a series of the Soil and Water Science Department; Florida Cooperative Extension Service* (Dec. 1993), pp. 1–9.

Ortho Books, "Definition of Phosphorus" *All About Fertilizers, Soils & Water, Ortho Books* (No date), p. 53.

Ouimette, et al. "Comparative Antifungal Activity of Four Phosphonate Compounds Against Isolates of Nine Phytophthora Species" *Phytopathology* (Feb. 1989) vol. 79(7), pp. 761–767.

PhilomBios DowElanco, "Provide:" *Product Information Brochure published by PhilomBios DowElanco*, Winnepeg, Canada (no date), 8 pages.

Potash & Phosphate Institute, "Phosphorus the Energizer: Improving Plant Production for Human Health and Environmental Quality" *Published by Potash & Phosphate Institute; Atlanta, Georgia* (no date) 12 pages.

Potash & Phosphate Institute, "Phosphorus . . . for the People and the Environment" *Published by Potash & Phosphate Institute; Atlanta, Georgia* (no date) 12 pages.

Prusky and Keen, "Involvement of Preformed Antifungal Compounds in the Resistance of Su87btropical Fruits to Fungal Decay" *Plant Disease* (1993) vol. 77(2), pp. 114–119, no month.

Rashid, et al. "Effects of Nitrogen, Phosphorus and Sulfur Fertilizer Combinations on the Severity of Alternaria, Drechslera and Bacterial Leaf Blights of Wheat" *Bangladesh Journal of Plant Pathology* (1985) vol. 1(1) pp. 33–39. CAB Abstract, no month.

Reis, et al. "Effect of Mineral Nutrition on Take–all of Wheat" *Ecology and Epidemiology: Phytopathology* (1982) vol. 72(2), pp. 224–229, no month.

Robertson and Boyer, "The Biological Inactivity of Glucose 6–Phosphite, Inorganic Phosphites and Other Phosphites," Archives of Biochemistry and Biophysics, vol. 62, 380–395, 1956, no month.

Robertson, et al. "Orthoposphite as a Buffer for Biological Studies" *Archives of Biochemistry and Biophysics*(1956), vol. 62, pp. 396–401, no month.

Rothbaum et al., "The Use of Red Phosphorus as a Fertilizer. Part 1. Rates of Oxidation of Red Phosphorus in Soil," New Zealand Journal of Science, 7, pp. 51–66, 1964 (No Month).

Rothbaum and Kitt, "The Use of Red Phosphorus as a Fertiliser. Part 2. Extended Studies on Oxidation Rates of Red Phosphorus," New Zealand Journal of Science, 7, pp. 67–74, 1964 (No Month).

Widdowson (and Rothbaum) et al., "The Use of Red Phosphorus as a Fertiliser. Part 3. Spot Trials with Perennial Ryegrass and White Clover," New Zealand Journal of Science, 7, pp. 427–455, 1964 (No Month).

Rothbaum and Baillie, "The Use of Red Phosphorus as a Fertiliser. Part 4. Phosphite and Phosphate Retention in Soils," New Zealand Journal of Science, 7, pp. 446–451, 1964 (No Month).

Rothbaum, H.P., "The Use of Red Phosphorus as a Fertiliser. Part 5. The Effect of Copper on the Oxidation Reaction of Red Phosphorus," New Zealand Journal of Science, 8, pp. 388–397, 1965 (No Month).

Simpson, Ken "Fertilizers and Manures" Published by Harlow, Essex, England: Longman Scientific & Technical; New York; J. Wiley & Sons (1991), no month.

Smilke, et al. "The Mode of Action of Phosphite: Evidence for both Direct and Indirect Modes of Action on Three *Phytophthora* spp in Plants" *Phytopathology* (1989) vol. 79(9), pp. 921–926, no month.

Sparks, "Growth of Nutrition of Pecan Seedlings from Potassium Phosphate Foliar Sprays" Hort–Science, (1986) vol. 21, pp. 451–453, no month.

Sugar, et al. "Management of Nitrogen and Calcium in Pear Trees for Enhancement of Fruit Resistance to Postharvest Decay" *Hort Technology* (Jul.–Sep. 1992) vol. 2(3), pp. 382–387.

Sukarno et al., "The Effect of Fungicides on Vesicular–Arbuscular Mycorrhizal Symbiosis," *New Phytologist* (1993) vol. (25), pp. 139–147, no month.

Thompson, et al. "Liming and Southern Crops: A Working Partnership" *Better Crops with Plant Food: Published by the Potash & Phosphate Institute (PPI) Norcross, Georgia* (1993/1994), pp. 18–19, no month.

Toerlen and Slabbert, "Phosphorous Nutrition of Avocados Through Truck Injection," Avocado Grower, p. 10, Jan. 1985.

Tsubota, Goro, "Phosphate Reduction the Paddy Field I, Soil and Plant Food," (1959) vol. 5(1), pp. 10–15, no month.

Unknown, "Foliar Applications Do Double Duty" *Citograph* (May 1990) vol. 75(7), p. 161.

Unknown, Abstract entitled "Agricola (1970–1978)," (unknown publication), 1 page, 1992, no month.

Labels for "Resistim," a product of Mandops (UK) Limited, undated but believed to be before Feb. 7, 1993.

Unknown, "Don't Back Away from a Phosphite Confrontation," (unknown publication), p. 5, Apr. 21, 1992.

Walters, et al. "Induction of Systemic Resistance to rust in *Vicia faba* by Phosphate and EDTA: Effects of Calcium" *Plant Pathology* (1992) vol. 4, pp. 444–448, no month.

Ward, B. W., "Assessing Phosphorus Buildup in Crop Acreage—The Upper Vermilion Watershed Project", *Better Crops with Plant Food: Published by the Potash & Phosphate Institute (PPI) Norcross, Georgia* (1993/1994), pp. 16–17, no month.

Watt, H.V.H. van der, et al. "Amelioration of Subsoil Acidity by Application of a Coal–derived Calcium Fulvate to the Soil Surface" *Nature* (1991) vol. 350(6314), pp. 146–148, no month.

W.B. McLean & Sons of Clermont Florida, *Correspondence to Mr. Bill Paul;* (Dec. 28, 1993), 2 pages.

W.B. McLean & Sons of Clermont Florida, *Correspondence to Mr. Bill Paul;* (Feb. 4, 1994), 2 pages.

W.B. McLean & Sons of Clermont Florida, *Facsimile Correspondence to Mr. Gurney;* (No Date), 2 pages.

W.B. McLean & Sons of Clermont Florida, *Correspondence to Mr. Lex;* (No Date), 2 pages.

Wild, Brian, "Enhanced Natural Decay Control in Citrus Fruit" *Published by Gosford Horticulture Postharvest Laboratory Gosford, NSW* (No Date), 7 pages.

Windhols, M. (editor) "Definition of Calcium Phosphate ($CAHPO_3$)" *Merck Index, 11th ed.* (1994) p. 256, no month.

Yuda et al, "Search for Efficient Phosphorus Fertilization," Proc. Intern'l. Soc. Citriculture, 1981 (No Month).

* cited by examiner

FORMULATION OF PHOSPHORUS FERTILIZER FOR PLANTS

This is a continuation of application Ser. No. 09/126,233, filed Jul. 30, 1998, now U.S. Pat. No. 6,113,665 which is a continuation of application Ser. No. 08/642,574, filed May 3, 1996, now U.S. Pat. No. 5,830,255, re-examined as U.S. Pat. No. B1 5,830,255 (certificate issued Jul. 11, 2000), which is a continuation of application Ser. No. 08/192,508, filed Feb. 7, 1994, now U.S. Pat. No. 5,514,200.

BACKGROUND OF THE INVENTION

Fertilizers are added to the soil of crops or in some cases they can be applied directly to crop foliage to supply elements needed for plant nutrition. Seventeen elements are known to be essential to the health and growth of plants. Typically, nitrogen, phosphorus, and potassium are provided in the greatest quantity. With increasing knowledge of the role of each of the nutrients essential to plants, there is a better understanding of the importance of providing a given nutrient at the appropriate stage of phenology. To accomplish this, rapid changes in fertilizer formulations and methods of application have been necessary.

Another factor changing fertilization formulations and methods is due to pressure from federal, state and local regulatory agencies and citizen groups to reduce the total amount of fertilizer in general, and of specific nutrients in particular, being applied to the soil. Additionally, the loss of registration of existing synthetic plant growth regulators and organic pesticides and the prohibitively high costs involved in the successful registration of new ones, also plays a role in the changing arena of crop fertilization.

The principal source of phosphorus for the fertilizer industry is derived from the ores of phosphorus-containing minerals found in the Earth's crust, termed phosphate rock. Elemental phosphorus does not exist in nature; plants utilize phosphorus as the dihydrogen phosphate ion ($H_2PO_4$). While untreated phosphate rock has been used for fertilizer, it is most commonly acidulated with dilute solutions of strong mineral acids to form phosphoric acid, which is more readily absorbed by crops.

Until recently, phosphate and polyphosphate compounds were considered the only forms in which phosphorus could be supplied to plants to meet the plant's nutritional need for phosphorus. Indeed, the only phosphite compound cited for use as a fertilizer in the Merck Index (M. Windhols, ed., 1983, 10th edition, p. 1678) is calcium phosphite ($CaHPO_3$). No phosphite fertilizer formulations are listed in *The Farm Chemical Handbook* (Meister Publishing Co., 1993, Willoughby, Ohio 834 p.) or *Western Fertilizer Handbook* (The Interstate, Danville, Ill. 288 p.) Historically, calcium phosphite was formed as a putative contaminant in the synthesis of calcium superphosphate fertilizers [Mcintyre et al., *Aaron. J.* 42:543–549 (1950)] and in one case, was demonstrated to cause injury to corn [Lucas et al., *Agron. J.* 71:1063–1065 (1979)]. Consequently, phosphite was relegated for use only as a fungicide (Alliete®; U.S. Pat. No. 4,075,324) and as a food preservative.

More recently, it has been shown that plants can obtain phosphorus from phosphite [Lovatt, C. J., Mar. 22, 1990, "Foliar phosphorus fertilization of citrus by foliar application of phosphite" In: Citrus Research Advisory Committee (eds) Summary of Citrus Research, University of California, Riverside, Calif. pp 25–26; Anon., May, 1990, "Foliar applications do double duty" In: L. Robison (ed) Citrograph Vol. 75, No. 7, p 161; Lovatt, C. J., 1990, "A definitive test to. determine whether phosphite fertilization can replace phosphate fertilization to supply P in the metabolism of 'Hass' on 'Duke 7':—A preliminary report" California Avocado Society Yearbook 74:61–64; Lovatt, C. J., 1992]. Formulations based on phosphorous acid and hypophosphorous acid, as phosphite is, generally undergo oxidation to phosphate and thus lose the benefits that could be derived from the use of phosphite fertilization applications.

The phosphate and polyphosphate fertilizers currently used have a number of properties that compromise their desirability as fertilizers. Generally, they tend to form precipitates during storage and shipping. This limits the ability to formulate concentrated solutions of fertilizers. Additionally, formulations must generally be maintained at a narrow pH range to prevent precipitation, resulting in fertilizers that are limited to particular uses.

Another drawback of phosphate fertilizers is that they are not readily taken up by the foliage of many plants and must instead be delivered to the soil for uptake by plant roots. The mobility of phosphate fertilizers in the soil is limited leading to rapid localized depletion of phosphorus in the rhizosphere and phosphorus deficiency of the plant. Frequent reapplication of phosphate fertilizers is undesirable because it leads to leaching of phosphate into the groundwater resulting in eutrophication of lakes, ponds and streams.

Phosphate and polyphosphate fertilizers have also been shown to inhibit the beneficial symbiosis between the roots of the plants and mycorrhizal fungi. They tend to support the growth of algae and promote bacterial and fungal growth in the rhizosphere, including the growth of pathogenic fungi and other soil-borne pests.

Even though phosphorus, once in the plant, is very phloem mobile (i.e. readily moving from old leaves to young tissues), phosphate is poorly absorbed through the leaves of most plant species. This is unfortunate because successful foliar phosphorus feeding would result in the application of less phosphate fertilizers to the soil and reduce phosphorus pollution of the ground water.

Accordingly, there is a need for a phosphorus fertilizer that can be utilized in irrigation systems and applied to foliage without the formation of precipitates that reduce nutrient availability and uptake by the plant and plug emitters and sprayers. There is also a need for new methods of fertilizer application that allow nutrients in a readily available form to be supplied at the exact time the plant needs them. This need includes the facility of a foliar product to be sold in a single formulation for use as a concentrated material for airplane or helicopter application or as a dilute solution for ground spray application and yet able to be maintained at a suitable pH range optimal for leaf uptake despite the need to be diluted prior to application.

Additionally, there is a demand for phosphorus fertilizers that have the facility to be used as liquids or solids (granule or powder). There is also a demand for fertilizers that do more than just supply nutrients. It is desired that the fertilizers also have demonstrated plant growth regulator activity, increase the plants' resistance to pests, promote plant health in general and root health in particular, increase the production of allelopathic compounds, increase pre- and post-harvest quality, improve stress tolerance, enhance beneficial symbioses, and improve yield over existing traditional soil or foliar fertilizers.

SUMMARY OF THE INVENTION

Given the above-mentioned deficiencies and demands of fertilizers in general, and of phosphorus fertilizers in particular, it is an object of the present invention to provide phosphorus to plants in a formulation that renders phosphorus readily available to the plants under a number of application methods such as through soil, foliar uptake, irrigation, and other methods.

It is also an object that the phosphorus fertilizer formulations be conveniently formulated in concentrated solutions that are stable during storage and shipping.

Another object of the present invention is to provide a phosphorus fertilizer that is not as inhibitory to mycorrhizal fungi as traditional phosphate fertilizers.

It is a further object of the present invention to provide a phosphorus fertilizer that does not support the growth of algae to the same degree that traditional phosphate fertilizers do.

Additional objects and features of the invention will be apparent to those skilled in the art from the following detailed description and appended claims.

The above objects and features are accomplished by a concentrated phosphorus fertilizer comprising a buffered composition comprising an organic acid and salts thereof and a phosphorous-containing acid and salts thereof. The concentrated phosphorus fertilizer can be diluted with water of pH ranging from about 6.5 to about 8.5 at ratios of concentrate to water at about 1:40 to about 1:600 to result in a fully solubilized fertilizer having a pH in a range acceptable for foliar uptake of phosphorus.

In one embodiment, the phosphorous-containing acid is selected from the group consisting of phosphorous acid, hypophosphorous acid, polyphosphorous acid, and polyhypophosphorous acid and the organic acid is preferably selected from the group consisting of dicarboxylic acids and tricarboxylic acids such as citrate.

In one embodiment, the concentrated phosphorus fertilizer is an essentially clear liquid devoid of precipitate that can be diluted at a ratio of about 1:40 to about 1:600 with water having pH of about 6.5 to about 8.5, to result in a fertilizer having a pH of about 5.0 to about 7.0, and more preferably from about 5.5 to about 6.5, to facilitate the uptake of phosphorus by a variety of plants.

A method of providing phosphorus to plants is also disclosed. The method comprises diluting a concentrated phosphorus fertilizer comprising a buffered composition comprising an organic acid and salts thereof and a phosphorous-containing acid and salts thereof with water to form a substantially fully solubilized use-dilution fertilizer having a pH in a range acceptable for foliar uptake of phosphorus, and applying the fertilizer to the plant foliage.

DETAILED DESCRIPTION OF THE INVENTION

The present invention provides phosphorus fertilizers essentially devoid of phosphate. The fertilizer comprises a double or multiple buffer system of organic acids and their salts with a phosphorous-containing acids and their salts. The formulation stabilizes the phosphorous against oxidation to phosphate. Suitable phosphorous-containing acids are phosphorous acid and polyphosphorous acid, based generally on the formula $H_3PO_3$, and hypophosphorous acid and polyhypophosphorous acid, based generally on the formula $H_3PO_2$. Phosphite, the salt of phosphorous acid, has properties that are known to be beneficial to crop production. It is taken up through the foliage of avocado and citrus, two species which classically do not take up phosphate through their foliage. Phosphite has fungicidal properties with regard to some species of pathogenic fungi: *Rhizoctonia solani*, *Botrytis cinerea*, *Piricularia oryzae*, *Plasmopora viticola*, *Phytophthora cinnamomi*, and *Phytophthoraparasitica*. Recently, it has been demonstrated that phosphite also serves as a source of metabolically active phosphorus in plants. The properties of phosphite that make it desirable as a fertilizer are enhanced when it is formulated according to the present invention as a double or multiple buffer with phosphorous acid, hypophosphorous acid, polyphosphorous acid and/or polyhypophosphorous acid and their respective salts and organic acids and their salts per this invention.

Suitable organic acids have the formula R—COOH or R—COO$^-$ where R is hydrogen or a carbon-containing molecule or group of molecules. Suitable organic acids are those that maintain the phosphite ion in a substantially fully solubilized form upon dilution with water at pH varying from about 6.5 to about 8.5 and that result in a use-dilution fertilizer having a foliage acceptable pH for phosphorus uptake. Preferred organic acids are dicarboxylic and tricarboxylic acids.

By the term "substantially fully solubilized" it is meant that upon dilution, the phosphite does not precipitate, or at least not appreciably, so as to affect administration of the liquid product to the plant foliage, and thus is in a form available to the plant. With present phosphite fertilizers, there is a tendency for phosphite to precipitate if diluted with alkaline water, thereby rendering the phosphite in a form that is unavailable to the plant for uptake. By the term "foliage-acceptable pH for phosphorus uptake", it is meant a pH that allows phosphorus to be absorbed by the plant without causing damage to the foliage. A foliage-acceptable pH for phosphorus uptake usually ranges between about 5.0 to about 7.0, and preferably between about 5.5 to about 6.5. Phosphorus is most readily taken up by foliage at pH 6.0. Depending on the plant species, a pH below 5.0 can cause damage to leaves and/or the flowers and/or fruit. At higher pH, between about 7.0 to about 7.5, there is reduced uptake of nutrients, although generally there is no plant damage. A pH between about 7.5 and 8.0, depending on the plant species, plant damage may result. A pH greater than 8.0, generally causes damage to the plant in addition to reducing uptake of the nutrients. Accordingly, suitable organic acids are those that help provide a "buffered composition" having the desired pH range. This means that a "use-dilution fertilizer" having an acidic to neutral pH (pH 5.0 to 7.0) can be achieved upon high dilutions (up to about 1/600) of the concentrated fertilizer with highly alkaline water (up to a pH of about 8.5).

Organic acids that meet this criteria include but not limited to intermediates in the Kreb's Tricarboxylic Acid Cycle, amino acids such as glutamic acid and aspartic acid, vitamin acids such as ascorbic acid and folic acid, and their respective salts. Particularly preferred organic acids are dicarboxylic and tricarboxylic acids selected from the group consisting of citrate, pyruvate, succinate, fumarate, malate, formate, oxaloacetate, citrate, cis-aconitate, isocitrate, and a-ketoglutarate. Citrate is a particularly preferred organic acid because of it is relatively inexpensive and readily available.

These formulations allow the maintenance of continued solubility, and thus availability for uptake by plants, of phosphorus, with or without other nutrients, over a significantly wide range of concentrations and pHs. The increased solubility of these formulation over that of phosphate or phosphite fertilizers makes it possible to prepare fertilizers with a greater concentration of phosphorus per unit volume than traditional phosphate or polyphosphate fertilizers or the simple unbuffered salts of phosphorous acid recently being marketed as fertilizers for foliar application which are available as super saturated solutions with only about 16% phosphite, and which are diluted approximately 1:100 to about 1:300. The resulting pH of these fertilizers varies significantly depending upon the pH of the water used, thus affecting the availability of the nutrients for foliar uptake. In contrast, the highly concentrated fertilizers of the present invention, which can be diluted with water at a ratio of about 1:600, allow for more cost effective shipping, handling, and application. They result in greater uptake of phosphorus by the canopy of plants than traditional phosphate or recent phosphite fertilizers not formulated in this manner.

The formulations provided herein also make it possible to formulate various combinations of other essential plant nutrients or other inorganic or organic compounds as desired and maintain their solubility when used over a wide range of concentrations and pHs, which is not possible for present phosphate or phosphite fertilizers. For example, boron, manganese, calcium, iron and other elements can be provided at relatively high concentrations in these formulations. Thus, these phosphorus fertilizers also enhance the canopy uptake of other mineral nutrients essential to plants. They can be used as a canopy application to improve pre- and post-harvest crop quality.

Formulations can also prepared with copper. However, when high concentrations of copper are used, the copper is not fully solubilized. In this situation, the insoluble copper is desirable as it prevents rapid uptake of the copper and thus minimizes the potential for copper toxicity. As the insoluble copper is rewetted over night by dew, dissolution occurs so that additional copper is taken up. The buffering capacity of the formulation maintains the pH at a foliage-acceptable pH when the insoluble copper is rewetted so that conditions are optimal for uptake and are benign to the plant tissues. While copper is an element essential to plants, it is required in only small amounts. In relation to nitrogen, plants require, in general, 10,000- to 75,000-fold less copper. Provided to the foliage of the plant at the rate provided by this formulation, copper is a very effective fungicide, in addition to being a plant nutrient and fertilizer.

In addition to the above-mentioned advantages, the formulations disclosed have a direct benefit to the environment. Because the formulations allow successful foliar feeding of phosphorus to a number of plants that do not effectively take up phosphorus when supplied in phosphate or polyphosphate forms, and because these formulations enhance the uptake of other nutrients, they are cost-effective and can replace less efficient, traditional soil-feeding methods. This results in reducing phosphate pollution of the groundwater and eutrophication of freshwater ponds, lakes and streams.

The phosphorus fertilizers disclosed herein can also be advantageously applied through the soil or by irrigation systems as solid (granular) or liquid formulations. These formulations can be used at pHs sufficiently low to clean irrigation lines and alter the pH of the soil to solve alkalinity problems while supplying essential nutrients to plants. Example 2, below discloses a suitable formulation for irrigation application. With irrigation application, the fertilizer flowing through the irrigation system will typically have a pH lower than about 2.5, usually less than about pH 1.5. The low pH is designed to supply phosphorus while killing bacteria and algae (slime) which plug irrigation lines, thus cleaning the lines. The low pH also dissolves calcium carbonate deposits at and around the emitters, and solubilizes the calcium carbonate so $Ca^{2+}$ is available to the plant. Once delivered to the soil near the plant, sufficient water is applied to achieve a pH suitable for phosphorus uptake by the plant. The form in which the phosphorus is supplied in these formulations is more mobile than phosphate fertilizers or than the simple salts of phosphorous acid recently being sold as fertilizers, and thus more available and more readily taken up by the roots of plants. An advantage of these formulations is that the form in which phosphorus is supplied does not inhibit the development of mycorrhizal fungi to the same degree that traditional phosphate fertilizers do. The present compositions can also be formulated with certain nutrients in addition to phosphorus that are readily absorbed through soil applications at pH of about 5.5 to about 7.0. Such nutrients include nitrogen, calcium, magnesium, potassium, molybdenum, boron, and sulfur.

Another advantage with the phosphorus fertilizers disclosed herein is that they do not support the growth of green algae to the same degree that traditional phosphate fertilizers do. This is of significant importance to agriculture, commercial nurseries, the ornamental and cut flower industry, and the home and garden industry, as it will prevent the growth of green algae which typically proliferate and plug irrigation emitters, foul pots and benches, and provide a niche for the growth of pathogenic bacteria and fungi. These formulations also endow the phosphorus fertilizer with anti-viral, anti-bacterial and anti-fungal activity. This bacterialcidal activity in a phosphorus fertilizer makes it possible to use this fertilizer to inhibit ice-nucleating bacteria to thus protect plants from frost damage.

Methods of Preparation

The phosphorus fertilizers are prepared by first forming solutions of the phosphorous and organic acids. Other desired nutrients can then be added with constant stirring. The amount of phosphorous relative to organic acid is not critical, as long as appropriate buffering and solubility are achieved. Generally the amount of organic acid that is added will depend upon the form in which the nutrient elements are added. For example, if calcium is to be added in the form of calcium hydroxide (a base), then the acid form of the organic acid, for example citric acid, would be used rather than its salt, citrate. In addition to the desired nutrients, other additives, that are known in the fertilizer industry, can be added. These include, for example, wetting agents, surfactants, spreaders, stickers etc., and are described in *The Farm Chemical Handbook*, supra (incorporated herein by reference). The fertilizer compositions can also be prepared as solid formulations, identical to the liquid ones by simply leaving out all of the water. The properties are the same as the liquid formulations but have the additional advantage of weighing less for the same amount of nutrient.

Methods of Application

The fertilizer is applied according to crop-specific recommendations which will depend upon the application method (foliar, soil, irrigation, etc.), time of application, rate of application, and product formulation. Crops that will benefit from the fertilizer include, but are not limited to, avocado, citrus, mango, coffee, deciduous tree crops, grapes and other berry crops, soybean and other commercial beans, corn, tomato, cucurbits and cucumis species, lettuce, potato, sugar beets, peppers, sugarcane, hops, tobacco, pineapple, coconut palm and other commercial and ornamental palms, hevea rubber, and ornamental plants.

In addition to the foliar, soil, and irrigation application methods mentioned above, the present fertilizer may prove beneficial to certain crops through other application methods. For example, trunk paints or other methodologies may provide for a continuous low supply of fertilizers, such as, for example, "intravenous" feeding as practiced in the boron nutrition of soybeans.

In order that the invention described herein may be more fully understood, the following examples are set forth. All chemicals used were of analytical reagent quality and approximately 100% by weight unless otherwise specified. All formulations are expressed in terms of weight to volume. It should be understood that these examples are for illustrative purposes only and are not to be construed as limiting the scope of the invention in any manner.

EXAMPLE 1

A formulation was prepared of 1 gallon of 0-40-0 fertilizer with 3.86 lbs $H_3PO_3$, 1.34 lbs tripotassium citrate, 1.34 lbs of trisodium citrate, and 4.0 lbs of 58% ammonium hydroxide. The components were dissolved in water with constant stirring. This single formulation can be used at a rate of 2 quarts in as little as 20 gallons of water of pH 6.5 to 8.5 up to 300 gallons of water of pH 6.5 to 8.5 and maintain a pH between 5.5 to 6.5 without the formation of any precipitate.

EXAMPLE 2

A formulation was prepared of 1 gallon of 0-40-0 fertilizer with 3.86 lbs $H_3PO_3$ and 0.5 lbs citric acid. This formulation is stable at pH 1.0 or less and is designed for application through the irrigation system. It is stable against oxidation and precipitation when supplied through the irrigation water.

EXAMPLE 3

A formulation was prepared of 1 gallon of 0-30-0 fertilizer with 74.89% elemental boron with 2.89 lbs $H_3PO_3$, 28.67 lbs borax ($Na_2B_4O_7.10\ H_2O$), 17.16 lbs boric acid ($H_3BO_3$), 1.54 lbs $H_2SO_4$ and 2.67 lbs citric acid. A solution of the phosphorous and citric acid was first prepared, then the other elements were added with constant stirring. This formulation can be used at the rate of 2 quarts in as little as 20 gallons of water of pH between 6.5 to 8.5 up to 300 gallons of water of pH 6.5 to 8.5 and maintain a pH between 5.5 to 6.5 without the formation of any precipitate.

EXAMPLE 4

A formulation was prepared of 1 gallon of 0-30-0 fertilizer with 21.57% Zn and 23.22% Mn with 2.89 lbs of $H_3PO_3$, 7.92 lbs $ZnSO_4$, 7.16 lbs $Mn(H_2PO_2)_2.H_2O$, 0.61 lbs citric acid and 0.87 lbs 58% $NH_4OH$. This formulation can be used at the rate of two quarts in as little as 20 gallons of water of pH between 6.5 to 8.5 up to 300 gallons of water of pH between 6.5 to 8.5 and maintain a pH between 5.5 to 6.5 without the formation of any precipitate.

EXAMPLE 5

A formulation was prepared of 1 gallon of 0-30-0 fertilizer with 5.4% Ca. It was packaged in a two-container system where 1 gallon of solution A contained 2.89 lbs $H_3PO_3$, 0.68 lbs $Ca(OH)_2$, and 0.28 lbs citric acid, and 1 gallon of solution B contained 0.16 lbs $Ca(OH)_2$, 0.60 lbs KOH, 3.34 lbs 58% $NH_4OH$, 0.28 lbs citric acid, and 0.67 lbs EDTA (ethylenediaminetetraacetic acid). Two quarts of solution A can be added to as little as 20 gallons of water of pH between 6.5 to 8.5 up to 300 gallons of water of pH between 6.5 to 8.5 followed by the addition of two quarts of solution B. The final solution is between pH 5.5 to 6.5 and without precipitation.

A formulation of 1 gallon of 0-30-0 fertilizer with 4.32% Ca can be made without requiring EDTA. This formulation is also packaged in a two-container system where 1 gallon of solution A contains 2.89 lbs $H_3PO_3$, 0.67 lbs $Ca(OH)_2$ and 0.28 lbs of citric acid, while 1 gallon of solution B contains 2.67 lbs of 58% $NH_4OH$, 0.6 lbs KOH. Two quarts of solution A can be added to as little as 20 gallons of water of pH between 6.5 to 8.5 up to 300 gallons of water of pH between 6.5 and 8.5 followed by the addition of two quarts of solution B. The final pH of the solution is between 5.5 and 6.5 and without precipitation.

EXAMPLE 6

A formulation was prepared of 1 gallon of 0-30-30 fertilizer with 2.89 lbs $H_3PO_3$, 2.99 lbs KOH, and 0.84 lbs citric acid. Two quarts can be added to as little as 20 gallons of water of pH between 6.5 to 8.5 and up to 300 gallons of water of pH between 6.5 and 8.5. The pH of the final solution is between 5.5 and 6.5 without precipitation.

EXAMPLE 7

A formulation was prepared of 1 gallon of 0-30-0 fertilizer having 4.8% iron with 2.89 $H_3PO_3$, 1.75 lbs iron-citrate, 0.74 lbs KOH, 0.62 lbs NaOH, and 2.00 lbs of 58% $NH_4OH$. Two quarts of the formulation can be added to as little as 20 gallons of water pH 6.5 to 8.5 and up to 300 gallons of water of pH 6.5 to 8.5. The pH of the final solution is between 5.5 to 6.7 without precipitation.

EXAMPLE 8

A formulation was prepared of 1 gallon of 0-30-0 fertilizer having 23.22% manganese with 2.89 $H_3PO_3$, 7.16 lbs. $Mn(H_2PO_2)_2$, and 0.133 lbs. sodium citrate. Two quarts of the formulation can be added to as little as 20 gallons of water pH 6.5 to 8.5 and up to 300 gallons of water of pH 6.5 to 8.5. The pH of the final solution is between 5.5 to 6.5 without precipitation.

EXAMPLE 9

A formulation was prepared of 1 gallon of 0-30-0 fertilizer having 57% copper with 2.89 $H_3PO_3$, 7.3 lbs $Cu(OH)_2$ (57% Cu), and 1.34 lbs of 58% $NH_4OH$. Two quarts can be added to as little as 20 gallons of water of pH 6.5 to 8.5 up to 300 gallons of water of pH 6.5 to 8.5. The pH of the final solution is between 5.5 to 6.5. The copper is not fully soluble, however this is desirable in that it prevents the rapid uptake of copper when applied to plant foliage.

What is claimed is:

1. A concentrated phosphorus fertilizer for irrigation application, said fertilizer comprising a buffered composition comprising a phosphorous-containing acid selected from the group consisting of phosphorous acid, hypophosphorous acid, polyphosphorous acid, polyhypophosphorous acid and salts thereof, wherein said phosphorous-containing acid or salt thereof is present in an amount of about 30 weight percent or greater, said composition having a pH less than about 2.5.

2. The phosphorus fertilizer of claim 1 having a pH of less than about 1.5.

3. The concentrated phosphorus fertilizer as in claim 1 wherein said phosphorous-containing acid or salt thereof is present in amount of about 30 weight percent to about 46 weight percent.

4. A method of providing phosphorus to a plant comprising distributing a liquid concentrated phosphorus fertilizer comprising a buffered composition comprising a phosphorous-containing acid selected from the group consisting of phosphorous acid, hypophosphorous acid, polyphosphorous acid, polyhypophosphorous acid and salts thereof, wherein said phosphorous-containing acid or salt thereof is present in an amount of about 30 weight percent or greater, through an irrigation system and delivering said fertilizer to soil near said plant, said fertilizer having a pH less than about 2.5.

5. The method of claim 4 wherein said fertilizer has a pH less than about 1.5.

6. The method as in claim 4 wherein said phosphorous-containing acid or salt thereof is present in an amount about 30 weight percent to about 46 weight percent.

* * * * *